United States Patent [19]

Reed et al.

[11] 4,357,392

[45] Nov. 2, 1982

[54] COVERSHEET FOR COLOR TRANSFER ASSEMBLAGES

[75] Inventors: Kenneth J. Reed; Patrick H. Saturno, both of Rochester; Gerald L. Ducharme, Naples, all of N.Y.

[73] Assignee: Eastman Kodak Company, Rochester, N.Y.

[21] Appl. No.: 308,060

[22] Filed: Oct. 2, 1981

Related U.S. Application Data

[62] Division of Ser. No. 175,224, Aug. 4, 1980, Pat. No. 4,314,020.

[51] Int. Cl.³ .......................... B32B 27/30; G03C 7/00

[52] U.S. Cl. .................................... 428/522; 428/480; 430/212; 430/215; 430/219; 430/564

[58] Field of Search ............... 430/215, 216, 212, 523, 430/564, 214, 219, 536; 428/500, 520, 522, 480

[56] References Cited

U.S. PATENT DOCUMENTS

| | | | |
|---|---|---|---|
| 3,362,819 | 1/1968 | Land | 430/216 X |
| 3,706,557 | 12/1972 | Arond . | |
| 3,779,756 | 12/1973 | Farran et al. . | |
| 4,009,029 | 2/1977 | Hammond et al. . | |
| 4,029,849 | 6/1977 | Abel | 428/500 |
| 4,056,394 | 11/1977 | Hannie | 428/500 |
| 4,061,496 | 12/1977 | Hannie et al. | 428/520 |
| 4,229,516 | 10/1980 | Abel | 430/215 |
| 4,256,826 | 3/1981 | Popp et al. | 430/213 |

FOREIGN PATENT DOCUMENTS

| | | | |
|---|---|---|---|
| 2388307 | 11/1978 | France . | |
| 1505699 | 3/1978 | United Kingdom | 430/215 |
| 2019392 | 4/1979 | United Kingdom . | |

OTHER PUBLICATIONS

Research Disclosure, 1979, Item No. 18452.

*Primary Examiner*—Thomas J. Herbert, Jr.
*Attorney, Agent, or Firm*—Harold E. Cole

[57] ABSTRACT

Photographic assemblages, elements, receiving elements and cover sheets comprise a combination of two timing layers and a neutralizing layer. The outermost timing layer contains photographic addenda, such as development inhibitors, for substantially terminating development of the silver halide emulsion. The timing layer next to the neutralizing layer has a much longer breakdown time so that it is permeated by the alkaline processing composition only after silver halide development has been substantially terminated.

4 Claims, No Drawings

COVERSHEET FOR COLOR TRANSFER ASSEMBLAGES

This is a division of application Ser. No. 175,224, filed Aug. 4, 1980, now U.S. Pat. No. 4,314,020, issued Feb. 2, 1982.

This invention relates to photography, and more particularly to photographic assemblages, elements, receiving elements and cover sheets for color diffusion transfer photography wherein a combination of two timing layers is employed along with a neutralizing layer. The outermost timing layer contains photographic addenda for substantially terminating development, while the innermost timing layer breaks down only after development has been substantially terminated. The assemblage is then neutralized by the neutralizing layer.

Various formats for color, integral transfer elements are described in the prior art, such as U.S. Pat. Nos. 3,415,644; 3,415,645; 3,415,646; 3,647,437; 3,635,707; 3,756,815, and Canadian Pat. Nos. 928,559 and 674,082. In these formats, the image-receiving layer containing the photographic image for viewing remains permanently attached and integral with the image generating and ancillary layers present in the structure when a transparent support is employed on the viewing side of the assemblage. The image is formed by dyes, produced in the image generating units, diffusing through the layers of the structure to the dye image-receiving layer. After exposure of the assemblage, an alkaline processing composition permeates the various layers to initiate development of the exposed photosensitive silver halide emulsion layers. The emulsion layers are developed in proportion to the extent of the respective exposures, and the image dyes which are formed or released in the respective image generating layers begin to diffuse throughout the structure. At least a portion of the imagewise distribution of diffusible dyes diffuse to the dye image-receiving layer to form an image of the original subject.

Other so-called "peel apart" formats for color diffusion transfer assemblages are described, for example, in U.S. Pat. Nos. 2,983,606; 3,362,819 and 3,362,821. In these formats, the image-receiving element is separated from the photosensitive element after development and transfer of the dyes to the image-receiving layer.

In color transfer assemblages such as those described above, a "shut-down" mechanism is needed to stop development after a predetermined time, such as 20 to 60 seconds in some formats, or up to 3 minutes or more in other formats. Since development occurs at a high pH, it is stopped by merely lowering the pH. The use of a neutralizing layer, such as a polymeric acid, can be employed for this purpose, which will stabilize the element after the required diffusion of dyes has taken place. A timing layer is usually employed in conjunction with the neutralizing layer, so that the pH is not prematurely lowered, which would stop development. The development time is thus established by the time it takes the alkaline composition to penetrate through the timing layer. As the system starts to become stabilized, alkali is depleted throughout the structure, causing silver halide development to cease in response to this drop in pH. For each image generating unit, this shutoff mechanism establishes the amount of silver halide development and the related amount of dye formed according to the respective exposure values.

U.S. Pat. No. 4,061,496 relates to a combination of two timing layers in various photographic elements. These timing layers are characterized by having a certain activation energy of penetration by an aqueous alkaline solution. One or more of these timing layers is useful in a preferred embodiment of our invention as the first timing layer, provided that it contains photographic addenda for terminating development of the silver halide emulsion.

U.S. Pat. No. 3,706,557 relates to the use of a temporary barrier layer in a photographic film unit to prevent migration of a development restrainer from a positive component to a negative component during storage, but permits such migration upon processing. The temporary barrier layer and timing layer in that patent, however, function differently than the combination of timing layers in our invention, where the innermost timing layer is permeated by alkaline processing composition only after silver halide development has been substantially terminated.

U.S. patent application Ser. No. 948,062 of Abel, filed Oct. 2, 1978, now U.S. Pat. No. 4,229,516, issued Oct. 21, 1980, relates to the use of a particular polymeric timing layer in color image transfer film units. This timing layer is useful as the second timing layer in our invention in a preferred embodiment thereof.

The use of development restrainers or precursors in diffusion transfer film units are disclosed, for example, in British Patent Application No. 2,019,392A, U.S. Pat. No. 4,009,029, and British Pat. No. 1,505,699. The use of such compounds in a combination of timing layers as described herein is not disclosed in these references, however.

U.S. Pat. No. 4,190,447 relates to the use of an alkali-permeable hydrophilic layer over a barrier timing layer on a cover sheet. These timing layers, however, have different functions than the timing layers of this invention.

U.S. patent application Ser. No. 933,399 of Popp et al, filed Aug. 14, 1978, now U.S. Pat. No. 4,256,826, issued Mar. 17, 1981 relates to a bleach-fix cover sheet comprising a silver bleaching agent, a silver salt fixing agent and a hydrophilic binder. Our combination of timing layers, however, is not disclosed in this patent application.

While prior art shutdown mechanisms based on pH reduction have worked reasonably well, there is room for improvement. For example, post process diffusion (PPD) of dyes is an undesirable buildup of dye density which sometimes occurs even after the system is supposedly shut down. It results in an undesirable increase in $D_{min}$. In a system employing sulfonamidonaphthol imaging chemistry, for example, reducing the pH of the film unit tends to adversely affect the rates of quinonimide deamidation and released dye diffusion. It would be desirable to have an alternative shutdown mechanism for a diffusion transfer system which would eliminate or improve the PPD problem.

We have found that a particular combination of timing layers according to our invention provides significant PPD advantages. The outermost or first timing layer "breaks down" or is permeated by alkaline processing composition in a relatively short time—three minutes, for example—and releases photographic addenda for substantially terminating silver halide development. The innermost or second timing layer has a much longer breakdown time—on the order of 10 or 20 minutes, for example. The alkaline processing composition, therefore, cannot reach the neutralizing layer until after that time. The system thus remains at a high pH for a comparatively long time. Less dye aggregation is obtained in this system, since dyes diffuse faster at high pH. Our system also provides excellent $D_{min}$ control and good incubation stability.

A photographic assemblage in accordance with our invention comprises:

(a) a photographic element comprising a support having thereon at least one photosensitive silver halide emulsion layer having associated therewith a dye image-providing material;

(b) a dye image-receiving layer;

(c) a neutralizing layer for neutralizing an alkaline processing composition;

(d) a first timing layer located between the neutralizing layer and the photosensitive silver halide emulsion layer; and (e) a second timing layer located between the first timing layer and the neutralizing layer; the first and second timing layers being so located that the processing composition must first permeate the timing layers before contacting the neutralizing layer, the neutralizing layer being located on the side of the second timing layer which is farthest from the dye image-receiving layer, and wherein:

(i) the first timing layer contains photographic addenda for substantially terminating development of the silver halide emulsion layer; and (ii) the second timing layer being capable of being permeated by the alkaline processing composition only after the silver halide development has been substantially terminated.

Various types of photographic addenda are used in the first timing layer according to our invention for substantially terminating development of the silver halide emulsion. Useful materials include, for example, development inhibitors, silver halide fixing agents or competing developers. These compounds are used in any concentration which is effective to produce the intended result. In a preferred embodiment of our invention, we have obtained good results using development inhibitors.

Any development inhibitor is useful in our invention, as long as it will substantially terminate development of the silver halide emulsion. Useful compounds include, for example, nitrogen-containing heterocyclic compounds such as: benzotriazoles, benzimidazoles and imidazoles, and substituted or unsubstituted heterocyclic thiols, such as: mercaptothiazoles, mercaptooxazoles, mercaptodiazoles, mercaptothiadiazoles, mercaptopyrimidines, mercaptobenzoxazoles, mercaptobenzimidazoles, or mercaptotetrazoles. Specific examples of such compounds include: 1-phenyl-5-mercaptotetrazole, benzotriazole, 5-methyl-benzotriazole, 2-benzimidazolethiol, 5-nitrobenzimidazole, 6-nitroindazole, 2-mercaptobenzoxazole, 5-acetyl-2-benzoylthio-4-methyltriazole, or 4-hydroxymethyl-4-thiazoline-4-thione. These compounds are used in concentrations of from about 50 to about 1,000 mg per square meter of element. The compounds are incorporated as solutions, as fine particulate dispersions or dissolved in droplets of a high boiling solvent.

Any material is useful as the first timing layer in our invention, provided it has the desired function and contains photographic addenda as described above. Suitable materials are disclosed, for example, on pages 22 and 23 of the July, 1974 edition of *Research Disclosure*, pages 35 through 37 of the July, 1975 edition of *Research Disclosure*, U.S. Pat. Nos. 4,029,849; 4,061,496 and 4,190,447, the disclosures of which are hereby incorporated by reference. As noted above, the breakdown time for this timing layer is relatively short, for example, from 2 to 6 minutes, preferably from 3 to 4 minutes.

The second timing layer of our invention is formed out of any of those materials described above for the first timing layer, provided its permeability is such that it cannot be permeated by the alkaline processing composition only until after silver halide development has been substantially terminated. This is achieved by selecting a material having this inherent property, by varying the thickness of the layer, by employing various hardeners for the layer, etc. As noted above, the breakdown time for this timing layer is relatively long, for example, from about 7 to about 20 minutes. In a preferred embodiment of the invention, the second timing layer has an activation energy of penetration of the layer by an aqueous alkaline solution of greater than 18 kcal/mole and comprises a mixture of (1) from about 5 to about 95 percent by weight of a terpolymer comprising from about 55 to about 85 percent by weight of vinylidene chloride, from about 5 to about 35 percent by weight of an ethylenically unsaturated monomer, and from about 0 to about 20 percent by weight of an ethylenically unsaturated carboxylic acid, and (2) from about 5 to about 95 percent by weight of a polymeric carboxy-ester-lactone. This preferred material is more fully described in Abel U.S. Pat. No. 4,229,516, issued Oct. 21, 1980. Such polymeric carboxy-ester-lactones comprise, for example, in a preferred embodiment, the following recurring structural units:

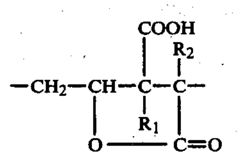

and

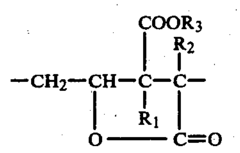

wherein:

$R_3$ is alkyl having from 1 to about 12 carbon atoms or aralkyl wherein said alkyl comprises from about 1 to about 4 carbon atoms; and $R_1$ and $R_2$ are independently hydrogen or methyl.

In another preferred embodiment, the lactone additionally comprises the following units:

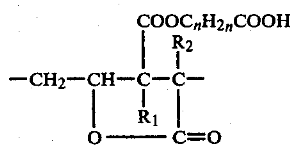

and

-continued

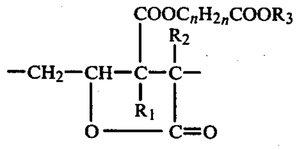

wherein n is an integer of from 1 to 5 and $R_3$, $R_1$ and $R_2$ are defined as above. For specific examples of such timing layers, polymeric carboxy-ester-lactones and their methods of preparation, reference is made to the Abel U.S. Pat. No. 4,229,516, issued Oct. 21, 1980, described above, the disclosure of which is hereby incorporated by reference.

The photographic elements for our invention comprising the two timing layers described above can also be overcoated, if desired, by other layers for various other purposes, e.g., additional timing layers, subbing layers, adhesion-promoting layers, etc.

The dye image-providing material useful in our invention is either positive- or negative-working, and is either initially mobile or immobile in the photographic element during processing with an alkaline composition. Examples of initially mobile, positive-working dye image-providing materials useful in our invention are described in U.S. Pat. Nos. 2,983,606; 3,536,739; 3,705,184; 3,482,972; 2,756,142; 3,880,658 and 3,854,985. Examples of negative-working dye image-providing materials useful in our invention include conventional couplers which react with oxidized aromatic primary amino color developing agent to produce or release a dye such as those described, for example, in U.S. Pat. No. 3,227,550 and Canadian Pat. No. 602,607. In a preferred embodiment of our invention, the dye image-providing material is a ballasted, redox-dye-releasing (RDR) compound. Such compounds are well known to those skilled in the art and are, generally speaking, compounds which will react with oxidized or unoxidized developing agent or electron transfer agent to release a dye. Such nondiffusible RDR's include positive-working compounds, as described in U.S. Pat. Nos. 3,980,479; 4,139,379; 4,139,389; 4,199,354 and 4,199,355. Such nondiffusible RDR's also include negative-working compounds, as described in U.S. Pat. Nos. 3,728,113 of Becker et al; 3,725,062 of Anderson and Lum; 3,698,897 of Gompf and Lum; 3,628,952 of Puschel et al; 3,443,939 and 3,443,940 of Bloom et al; 4,053,312 of Fleckenstein; 4,076,529 of Fleckenstein et al; 4,055,428 of Koyama et al; German Pat. Nos. 2,505,248 and 2,729,820; *Research Disclosure* 15157, November, 1976 and *Research Disclosure* 15654, April, 1977.

In a preferred embodiment of our invention, the dye-releasers such a those in the Fleckenstein et al patent referred to above are employed. Such compounds are ballasted sulfonamido compounds which are alkali-cleavable upon oxidation to release a diffusible dye from the nucleus and have the formula:

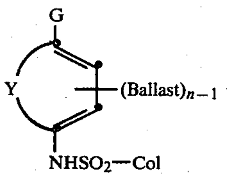

wherein:

(a) Col is a dye or dye precursor moiety;

(b) Ballast is an organic ballasting radical of such molecular size and configuration (e.g., simple organic groups or polymeric groups) as to render the compound nondiffusible in the photosensitive element during development in an alkaline processing composition;

(c) G is $OR_2$ or $NHR_3$ wherein $R_2$ is hydrogen or a hydrolyzable moiety and $R_3$ is hydrogen or a substituted or unsubstituted alkyl group of 1 to 22 carbon atoms, such as methyl, ethyl, hydroxyethyl, propyl, butyl, secondary butyl, tertiary butyl, cyclopropyl, 4-chlorobutyl, cyclobutyl, 4-nitroamyl, hexyl, cyclohexyl, octyl, decyl, octadecyl, docosyl, benzyl or phenethyl (when $R_3$ is an alkyl group of greater than 6 carbon atoms, it can serve as a partial or sole Ballast group);

(d) Y represents the atoms necessary to complete a benzene nucleus, a naphthalene nucleus or a 5- to 7-membered heterocyclic ring such as pyrazolone or pyrimidine; and (e) n is a positive integer or 1 to 2 and is 2 when G is $OR_2$ or when $R_3$ is a hydrogen or an alkyl group of less than 8 carbon atoms.

For further details concerning the above-described sulfonamido compounds and specific examples of same, reference is made to the above-mentioned Fleckenstein et al U.S. Pat. No. 4,076,529 referred to above.

In another preferred embodiment of our invention, positive-working, nondiffusible RDR's of the type disclosed in U.S. Pat. Nos. 4,139,379 and 4,139,389 are employed. In this embodiment, an immobile compound is employed which as incorporated in a photographic element is incapable of releasing a diffusible dye. However, during photographic processing under alkaline conditions, the compound is capable of accepting at least one electron (i.e., being reduced) and thereafter releases a diffusible dye. These immobile compounds are ballasted electron accepting nucleophilic displacement compounds.

The photographic element in the above-described photographic assemblage is treated with an alkaline processing composition to effect or initiate development in any manner. One method for applying processing composition is by interjecting processing solution with communicating members similar to hypodermic syringes which are attached either to a camera or camera cartridge. The processing composition can also be applied by means of a swab or by dipping in a bath, if so desired.

In another embodiment of the invention, the assemblage itself contains the alkaline processing composition and means containing same for discharge within the film unit, such as a rupturable container which is adapted to be positioned during processing of the film unit so that a compressive force applied to the container by pressure-applying members, such as would be found in a camera designed for in-camera processing, will effect a discharge of the container's contents within the film unit.

The dye image-receiving layer in the abovedescribed film assemblage is optionally located on a separate support adapted to be superposed on the photographic element after exposure thereof. Such image-receiving elements are generally disclosed, for example, in U.S. Pat. No. 3,362,819. In accordance with our invention, the dye image-receiving element would comprise a support having thereon, in sequence, a neutralizing layer, a second timing layer as described previously, a first timing layer as described previously and a dye image-receiving layer. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye image-receiving element is separated from the photographic element.

The dye image-receiving layer in the abovedescribed film assemblage in another embodiment is located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition over the photographic element as the film unit is withdrawn from the camera. The processing composition develops each exposed silver halide emulsion layer, and dye images, formed as a function of development, diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention is employed is disclosed in Canadian Pat. No. 928,559. In this embodiment, the support for the photographic element is transparent and is coated with the image-receiving layer, a substantially opaque, light-reflective layer and the photosensitive layer or layers described above. A rupturable container, containing an alkaline processing composition and an opacifier, is positioned between the top layer and a transparent cover sheet which has thereon, in sequence, a neutralizing layer, a second timing layer as described previously and a first timing layer as described previously. The film unit is placed in a camera, exposed through the transparent cover sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images, formed as a result of development, diffuse to the image-receiving layer to provide a positive, right-reading image which is viewed through the transparent support on the opaque reflecting layer background. For further details concerning the format of this particular integral film unit, reference is made to the above-mentioned Canadian Pat. No. 928,559.

Still other useful integral formats in which this invention can be employed are described in U.S. Pat. Nos. 3,415,644; 3,415,645; 3,415,646; 3,647,437 and 3,635,707. In most of these formats, a photosensitive silver halide emulsion is coated on an opaque support and a dye image-receiving layer is located on a separate transparent support superposed over the layer outermost from the opaque support. In addition, this transparent support also contains a neutralizing layer and the timing layers according to this invention underneath the dye image-receiving layer.

In another embodiment of the invention, the neutralizing layer and timing layers of the invention is located underneath the photosensitive layer or layers. In that embodiment, the photographic element would comprise a support having thereon, in sequence, a neutralizing layer, a second timing layer as described previously, a first timing layer as described previously and at least one photosensitive silver halide emulsion layer having associated therewith a dye image-providing material. A dye image-receiving layer would be provided on a second support with the processing composition being applied therebetween. This format could either be peel-apart or integral, as described above.

Another embodiment of the invention uses the image-reversing technique disclosed in British Pat. No. 904,364, page 19, lines 1 through 41. In this process, the dye-releasing compounds are used in combination with physical development nuclei in a nuclei layer contiguous to the photosensitive silver halide negative emulsion layer. The film unit contains a silver halide solvent, preferably in a rupturable container with the alkaline processing composition.

A process for producing a photographic transfer image in color according to our invention from an image-wise exposed photosensitive element comprising a support having thereon at least one photosensitive silver halide emulsion layer having associated therewith a dye image-providing material comprises treating the element with an alkaline processing composition in the presence of a silver halide developing agent to effect development of each of the exposed silver halide emulsion layers. The processing composition contacts the emulsion layer or layers prior to contacting a neutralizing layer. An imagewise distribution of dye image-providing material is thus formed as a function of development, and at least a portion of it diffuses to a dye image-receiving layer to provide the transfer image. A first timing layer, as described previously, associated with the neutralizing layer is permeated by the alkaline processing composition after a predetermined time, the first timing layer being located between the neutralizing layer and the photosensitive silver halide emulsion layer. This first timing layer releases photographic addenda contained therein for substantially terminating development of the silver halide emulsion. A second timing layer, described above, associated with the neutralizing layer, is also permeated by the alkaline processing composition after a predetermined time, the second timing layer being located between the first timing layer and the neutralizing layer. This second timing layer is permeated by said alkaline processing composition only after said silver halide development has been substantially terminated. The first and second timing layers are so located that the processing composition must first permeate the timing layers before contacting the neutralizing layer, which is located on the side of the second timing layer which is farthest from the dye image-receiving layer, so that the alkaline processing composition is neutralized by means of the neutralizing layer associated with the timing layers after the predetermined times.

The film unit or assemblage of the present invention is used to produce positive images in single or multicolors. In a three-color system, each silver halide emulsion layer of the film assembly will have associated therewith a dye image-providing material which possesses a predominant spectral absorption within the region of the visible spectrum to which said silver halide emulsion is sensitive, i.e., the blue-sensitive silver halide emulsion layer will have a yellow dye image-providing material associated therewith, the green-sensitive silver halide emulsion layer will have a magenta dye image-providing material associated therewith and the red-sensitive silver halide emulsion layer will have a cyan dye image-providing material associated therewith. The dye image-providing material associated with each silver halide emulsion layer is contained either in the silver halide emulsion layer itself or in a layer contiguous to the silver halide emulsion layer, i.e., the dye image-providing material can be coated in a separate layer underneath the silver halide emulsion layer with respect to the exposure direction.

The concentration of the dye image-providing material that is employed in the present invention can be varied over a wide range, depending upon the particular compound employed and the results desired. For example, the dye image-providing material coated in a layer at a concentration of 0.1 to 3 $g/m^2$ has been found to be useful. The dye image-providing material is dispersed in a hydrophilic film forming natural material or synthetic polymer, such as gelatin, polyvinyl alcohol, etc, which is adapted to be permeated by aqueous alkaline processing composition.

A variety of silver halide developing agents are useful in this invention. Specific examples of developers or electron transfer agents (ETA's) useful in this invention include hydroquinone compounds, such as hydroquinone, 2,5-dichlorohydroquinone or 2-chlorohydroquinone; aminophenol compounds, such as 4-aminophenol, N-methylaminophenol, N,N-dimethylaminophenol, 3-methyl-4-aminophenol or 3,5-dibromoaminophenol; catechol compounds, such as catechol, 4-cyclohexylcatechol, 3-methoxycatechol, or 4-(N-octadecylamino)-catechol; phenylenediamine compounds, such as N,N-diethyl-p-phenylenediamine, 3-methyl-N,N-diethyl-p-phenylenediamine, 3-methoxy-N-ethyl-N-ethoxy-p-phenylenediamine or N,N,N',N'-tetramethyl-p-phenylenediamine. In highly preferred embodiments, the ETA is a 3-pyrazolidinone compound, such as 1-phenyl-3-pyrazolidinone (Phenidone), 1-phenyl-4,4-dimethyl-3-pyrazolidinone (Dimezone), 4-hydroxymethyl-4-methyl-1-phenyl-3-pyrazolidinone, 4-hydroxymethyl-4-methyl-1-p-tolyl-3-pyrazolidinone, 4-hydroxymethyl-4-methyl-1-(3,4-dimethylphenyl)-3-pyrazolidinone, 1-m-tolyl-3-pyrazolidinone, 1-p-tolyl-3-pyrazolidinone, 1-phenyl-4-methyl-3-pyrazolidinone, 1-phenyl-5-methyl-3-pyrazolidinone, 1-phenyl-4,4-dihydroxymethyl-3-pyrazolidinone, 1,4-dimethyl-3-pyrazolidinone, 4-methyl-3-pyrazolidinone, 4,4-dimethyl-3-pyrazolidinone, 1-(3-chlorophenyl)-4-methyl-3-pyrazolidinone, 1-(4-chlorophenyl)-4-methyl-3-pyrazolidinone, 1-(3-chlorophenyl)-3-pyrazolidinone, 1-(4-chlorophenyl)-3-pyrazolidinone, 1-(4-tolyl)-4-methyl-3-pyrazolidinone, 1-(2-tolyl)-4-methyl-3-pyrazolidinone, 1-(4-tolyl)-3-pyrazolidinone, 1-(3-tolyl)-3-pyrazolidinone, 1-(3-tolyl)-4,4-dimethyl-3-pyrazolidinone, 1-(2-trifluoroethyl)-4,4-dimethyl-3-pyrazolidinone or 5-methyl-3-pyrazolidinone. A combination of different ETA's, such as those disclosed in U.S. Pat. No. 3,039,869, can also be employed. These ETA's are employed in the liquid processing composition or contained, at least in part, in any layer or layers of the photographic element or film unit to be activated by the alkaline processing composition, such as in the silver halide emulsion layers, the dye image-providing material layers, interlayers, image-receiving layer, etc.

In using dye image-providing materials in the invention which produce diffusible dye images as a function of development, either conventional negative-working or direct-positive silver halide emulsions are employed. If the silver halide emulsion employed is a direct-positive silver halide emulsion, such as an internal image emulsion designed for use in the internal image reversal process, or a fogged, direct-positive emulsion such as a solarizing emulsion, which is developable in unexposed areas, a positive image can be obtained on the dye image-receiving layer by using ballasted, redox, dye-releasers. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject.

Internal image silver halide emulsions useful in this invention are described more fully in the November, 1976 edition of *Research Disclosure,* pages 76 through 79, the disclosure of which is hereby incorporated by reference.

The various silver halide emulsion layers of a color film assembly employed in this invention are disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that is transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention is disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye image-providing materials are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Any material is useful as the image-receiving layer in this invention, as long as the desired function of mordanting or otherwise fixing the dye images is obtained. The particular material chosen will, of course, depend upon the dye to be mordanted. Suitable materials are disclosed on pages 80 through 82 of the November, 1976 edition of *Research Disclosure,* the disclosure of which is hereby incorporated by reference.

Any material is useful as the neutralizing layer in this invention, as long as it performs the intended purpose. Suitable materials and their functions are disclosed on pages 22 and 23 of the July, 1974 edition of *Research Disclosure,* and pages 35 through 37 of the July, 1975 edition of *Research Disclosure,* the disclosures of which are hereby incorporated by reference.

The alkaline processing composition employed in this invention is the conventional aqueous solution of an alkaline material, e.g, alkali metal hydroxides or carbonates such as sodium hydroxide, sodium carbonate or an amine such as diethylamine, preferably possessing a pH in excess of 11, and preferably containing a developing agent as described previously. Suitable materials and addenda frequently added to such compositions are disclosed on pages 79 and 80 of the November, 1976 edition of *Research Disclosure,* the disclosure of which is hereby incorporated by reference.

The alkaline solution permeable, substantially opaque, light-reflective layer employed in certain embodiments of photographic film units used in this invention is described more fully in the November, 1976 edition of *Research Disclosure,* page 82, the disclosure of which is hereby incorporated by reference.

The supports for the photographic elements used in this invention can be any material, as long as it does not deleteriously affect the photographic properties of the film unit and is dimensionally stable. Typical flexible sheet materials are described on page 85 of the November, 1976 edition of *Research Disclosure,* the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Research Disclosure,* Volume 176, December, 1978, Item 17643, pages 22 and 23, "Emulsion preparation and types"; they are usually chemically and spectrally sensitized as described on page 23, "Chemical sensitization", and "Spectral sensitization and desensitization", of the above article; they are optionally protected against the production of fog and stabilized against loss of sensitivity during keeping by employing the materials described on pages 24 and 25, "Antifoggants and stabilizers", of the above article; they usually contain hardeners and coating aids as described on page 26, "Hardeners", and pages 26 and 27, "Coating aids", of the above article; they and other layers in the photographic elements used in this invention usually contain plasticizers, vehicles and filter dyes described on page 27, "Plasticizers and lubricants"; page 26, "Vehicles and vehicle extenders"; and pages 25 and 26, "Absorbing and scattering materials", of the above article; they and other layers in the photographic elements used in this invention can contain addenda which are incorporated by using the procedures described on page 27, "Methods of addition", of the above article; and they are usually coated and dried by using the various techniques described on pages 27 and 28, "Coating and drying procedures", of the above article, the disclosures of which are hereby incorporated by reference.

The term "nondiffusing" used herein has the meaning commonly applied to the term in photography and denotes materials that for all practical purposes do not migrate or wander through organic colloid layers, such as gelatin, in the photographic elements of the invention in an alkaline medium and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium. "Mobile" has the same meaning as "diffusible".

The term "associated therewith" as used herein is intended to mean that the materials can be in either the same or different layers, so long as the materials are accessible to one another.

The following examples are provided to further illustrate the invention.

EXAMPLE 1

Post Process Diffusion (A) A control cover sheet of the type described in U.S. Pat. No. 4,229,516 of Abel issued Oct. 21, 1980, was prepared by coating the following layers, in the order recited, on a poly(ethylene terephthalate) film support:

(1) an acid layer comprising poly(n-butyl acrylate-co-acrylic acid), (30:70 weight ratio equivalent to 140 meq. acid/$m^2$); and (2) a timing layer comprising 5.4 g/$m^2$ of a 1:1 physical mixture by weight of poly(acrylonitrile-co-vinylidene chloride-co-acrylic acid latex) (weight ratio of 14/79/7) and a lactone polymer, partially hydrolyzed and 1-butanol transesterified poly(vinyl acetate-co-maleic anhydride), ratio of acid/butyl ester 15/85, containing 43 mg/$m^2$ of t-butylhydroquinone monoacetate, and 108 mg/$m^2$ of 5-(2-cyanoethylthio)-1-phenyl tetrazole.

(B) A second control cover sheet was prepared similar to (A), except that the polymer of layer 2 was coated at 3.2 g/$m^2$.

(C) A cover sheet according to the invention was prepared by coating the following layers, in the order recited, on a poly(ethylene terephthalate) film support (1) an acid layer comprising poly(n-butyl acrylate-co-acrylic acid), (30:70 weight ratio equivalent to 140 meq. acid/$m^2$); and (2) a timing layer comprising 2.6 g/$m^2$ of a 1:1 physical mixture by weight of poly(acrylonitrile-co-vinylidene chloride-co-acrylic acid latex) (weight ratio of 14/79/7) and a lactone polymer, partially hydrolyzed and 1-butanol transesterified poly(vinyl acetate-co-maleic anhydride), ratio of acid/butyl ester 15/85.

(3) gelatin layer (0.54 g/$m^2$); and (4) a timing layer comprising 3.2 g/$m^2$ of a 1:1 physical mixture by weight of poly(acrylonitrile-co-vinylidene chloride-co-acrylic acid latex) (weight ratio of 14/79/7) and a lactone polymer, partially hydrolyzed and 1-butanol transesterified poly(vinyl acetate-co-maleic anhydride), ratio of acid/butyl ester 15/85 containing 43 mg/$m^2$ of t-butylhydroquinone monoacetate, and 108 mg/$m^2$ of 5-(2-cyanoethylthio)-1-phenyl tetrazole.

(D) Another cover sheet according to the invention was prepared similar to (C), except that gelatin interlayer (3) was omitted.

An integral imaging-receiver element was prepared by coating the following layers in the order recited on a transparent poly(ethylene terephthalate) film support. Quantities are parenthetically given in grams per square meter, unless otherwise stated.

(1) image-receiving layer of a poly(divinylbenzene-co-styrene-co-N-benzyl-N,N-dimethyl-N-vinylbenzyl) ammonium sulfate (1/49.5/49.5) latex mordant (2.3) and gelatin (2.3);

(2) reflecting layer of titanium dioxide (16.2) and gelatin (2.6);

(3) opaque layer of carbon black (1.9), gelatin (1.2), oxidized developer scavenger 2-(2-octadecyl)-5-sulfohydroquinone potassium salt (0.03) and cyan RDR A (0.02) dispersed in N-n-butylacetanilide;

(4) cyan dye-providing layer of gelatin (0.65) and cyan RDR B (0.38) dispersed in N-n-butylacetanilide;

(5) interlayer of gelatin (0.54);

(6) red-sensitive, direct-positive silver bromide emulsion (0.91 silver), gelatin (0.91), Nucleating Agent A (125 mg/Ag mole), 2-(2-octadecyl)-5-sulfohydroquinone potassium salt (0.17) and Nucleating Agent B (6.6 mg/Ag mole);

(7) interlayer of gelatin (1.2) and 2,5-di-sec-dodecylhydroquinone (0.81);

(8) magenta dye-providing layer of magenta RDR C (0.34) dispersed in diethyllauramide) and gelatin (0.68);

(9) green-sensitive, direct-positive silver bromide emulsion (0.91 silver), gelatin (0.91), Nucleating Agent A (140 mg/Ag mole), Nucleating Agent B (1.3 mg/Ag mole), and 2-(2-octadecyl)-5-sulfohydroquinone potassium salt (0.17);

(10) interlayer of gelatin (1.2) and 2,5-di-sec-dodecylhydroquinone (0.97);

(11) interlayer of gelatin (0.55);

(12) yellow dye-providing layer of yellow RDR D (0.57) dispersed in di-n-butyl phthalate and gelatin (0.97);

(13) blue-sensitive, direct-positive silver bromide emulsion (0.91 silver), gelatin (0.91), Nucleating Agent A (96 mg/Ag mole), Nucleating Agent B (1.1 mg/Ag mole), and 2-(2-octadecyl)-5-sulfohydroquinone potassium salt (0.17); and

(14) overcoat layer of gelatin (0.89) and 2,5-di-sec-dodecylhydroquinone (0.11).

The direct-positive emulsions are approximately 0.8μ monodispersed, octahedral, internal image silver bromide emulsions, as described in U.S. Pat. No. 3,923,513.

CYAN RDR A

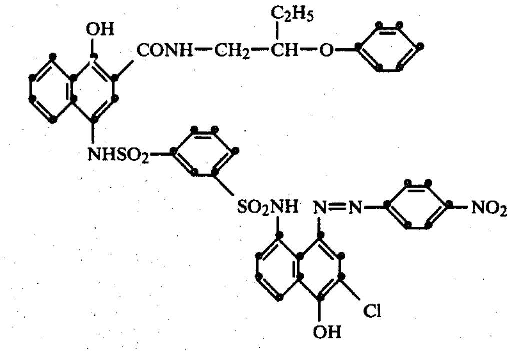

CYAN RDR B

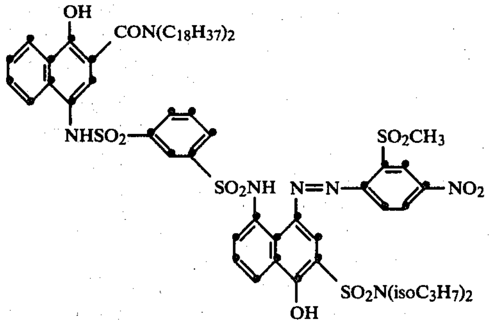

MAGENTA RDR C

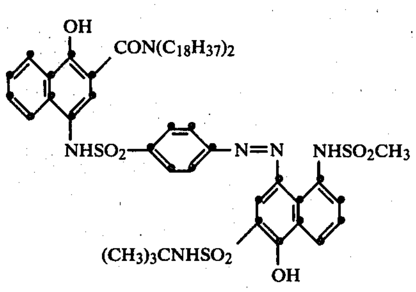

YELLOW RDR D

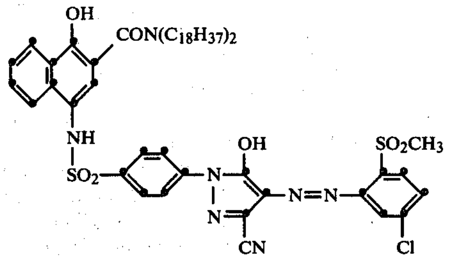

Nucleating Agent A

-continued

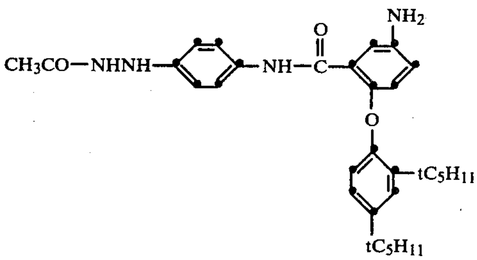

Nucleating Agent B

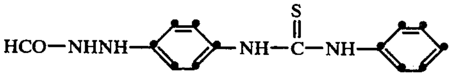

Samples of the imaging-receiver element were exposed in a sensitometer through a graduated density test object. The exposed samples were then processed at 21° C. by rupturing a pod containing the viscous processing composition described below between the imaging-receiver element and the cover sheets described above, by using a pair of juxtaposed rollers to provide a processing gap of about 65 μm.

The processing composition was as follows:

46.8 g potassium hydroxide
7 g 4,4′-dimethyl-4-hydroxymethyl-1-phenyl-3-pyrazolidinone
1.5 g 1,4-cyclohexanedimethanol
4 g 5-methylbenzotriazole
1 g sodium sulfite
6.4 g Tamol SN® dispersant
10 g potassium fluoride
66.8 g carboxymethylcellulose
171 g carbon water to 1 liter The red, green and blue densities of the resulting image are read after three hours. The densities of the same imaging element are read again after 72 hours (dark keeping at room temperature). The difference in density at D-max (maximum density) is a measure of the post-process dye diffusion. The following results were obtained:

by producing "toes" which are too soft and higher D-min's.

EXAMPLE 2

Post Process Dye Density Increases

A. A control cover sheet of the type described in U.S. Pat. No. 4,029,849 was prepared by coating the following layers, in the order recited, on a poly(ethylene terephthalate) film support:

(1) an acid layer comprising poly(n-butyl acrylate-co-acrylic acid) (30:70 weight ratio equivalent to 140 meq. acid/$m^2$);

(2) a timing layer comprising cellulose acetate (40 percent acetyl) at 4.0 g/$m^2$ and poly(styrene-co-maleic anhydride) at 0.26 g/$m^2$ containing 5-(2-cyanomethylthio)-1-phenyltetrazole at 110 mg/$m^2$; and (3) auxiliary timing layer of poly(acrylonitrile-co-vinylidene chloride-co-acrylic acid) latex in a (weight ratio of 14/79/7 coated at 2.2 g/$m^2$.

B. A cover sheet according to the invention was prepared by coating the following layers, in the order recited, on a poly(ethylene terephthalate) film support:

(1) an acid layer comprising poly(n-butyl acrylate-co-acrylic acid) (30:70 weight ratio equivalent to 140 meq. acid/$m^2$);

(2) a timing layer comprising 3.2 g/$m^2$ of a 1:1 physical mixture by weight of polyacrylonitrile-co-vinylidene chloride-co-acrylic acid) latex (weight ratio of 14/79/7) and a lactone polymer, partially hydrolyzed and 1-butanol transesterified poly(vinyl acetate-co-maleic anhydride), ratio of acid/butyl ester 15/85;

(3) a timing and addenda layer comprising cellulose acetate (40 percent acetyl) at 2.1 g/$m^2$, and poly(styrene-co-maleic anhydride) at 0.043 g/$m^2$ containing t-butylhydroquinone monoacetate (220 mg/$m^2$) and 5-(2-cyanomethylthio-1-phenyltetrazole (380 mg/$m^2$); and (4) auxiliary timing layer of poly(acrylonitrile-co-vinylidene chloride-co-acrylic acid) latex in a (weight ratio of 14/79/7 coating at 1.1 g/$m^2$.

A portion of the imaging receiver element of Example 1 was exposed and processed as in Example 1, but

| | | Sensitometry (three hours after transfer) | | | | | | | | | | | |
|---|---|---|---|---|---|---|---|---|---|---|---|---|---|
| | | D-min | | | D-max | | | D** | | | ΔD (3/72 hr)*** | | |
| Cover Sheet | TLB* | R | G | B | R | G | B | R | G | B | R | G | B |
| A (control) | 200 sec | 0.18 | 0.18 | 0.16 | 1.8 | 1.8 | 1.7 | 0.25 | 0.25 | 0.25 | +0.16 | +0.13 | +0.19 |
| B (control - different concentration) | 465 sec | 0.20 | 0.22 | 0.20 | 2.2 | 1.9 | 1.8 | 0.30 | 0.34 | 0.35 | +0.05 | +0.04 | +0.06 |
| C | 375 sec | 0.18 | 0.19 | 0.17 | 1.9 | 1.9 | 1.8 | 0.26 | 0.29 | 0.29 | +0.08 | +0.05 | +0.10 |
| D (no gel (interlayer) | 355 sec | 0.18 | 0.17 | 0.16 | 1.9 | 1.9 | 1.7 | 0.24 | 0.24 | 0.25 | +0.04 | +0.05 | +0.11 |

*TLB (timing layer breakdown) is the time required to reduce the pH to 10 of a simulated laminated film unit using a thymolphthalein indicator sheet and a cover sheet.
**D is the density 0.6 log E less exposure from a recorded density of 1.0. At these contrasts (approximately 1.7), it is an effective way to tabulate the presence of "soft toes".
***ΔD (3/72 hr) is the increase in maximum dye density observed between 3 and 72 hours after processing.

The above results indicate that cover sheets C and D according to the invention provide a significant improvement in minimizing 72-hour diffusion of all three dyes compared to the prior art control cover sheet A. While increasing the TLB in control cover sheet B by decreasing its coverage does minimize post-process dye diffusion, it has an unacceptable effect on sensitometry using the cover sheets described above. The red, green and blue density of the resulting image is read after three hours. The densities of the same imaging element are read again after 72 hours (dark keeping at room temperature). The difference in density at D-max is a measure of the post-process dye diffusion. The following results were obtained:

| Cover Sheet | ΔD (3/72 hr)* | | |
|---|---|---|---|
| | Red | Green | Blue |
| A (control) | +0.10 | +0.07 | +0.09 |
| B | +0.02 | 0 | 0 |

*ΔD (3/72 hr) is the increase in maximum dye density observed between 3 and 72 hours after processing The above results indicate that the cover sheet according to the invention provides a significant improvement in minimizing 72 hours diffusion of all three dyes, compared to the prior art control cover sheet.

The invention has been described in detail with particular reference to preferred embodiments thereof, but it will be understood that variations and modifications can be effected within the spirit and scope of the invention.

What is claimed is:

1. A cover sheet adapted to be permeated by an alkaline processing composition, comprising a transparent support having thereon, in sequence, a neutralizing layer for neutralizing said alkaline processing composition, a second timing layer and a first timing layer, said first timing layer being capable of being permeated by said alkaline processing composition in a relatively short time and containing photographic addenda for substantially terminating development of a silver halide emulsion layer, and said second timing layer being capable of being permeated by said alkaline processing composition only after said silver halide development has been substantially terminated.

2. The cover sheet of claim 1 wherein said second timing layer comprises a mixture of (1) from about 5 to about 95 percent by weight of a terpolymer comprising from about 55 to about 85 percent by weight of vinylidene chloride, from about 5 to about 35 percent by weight of an ethylenically unsaturated monomer, and from about 0 to about 20 percent by weight of an ethylenically unsaturated carboxylic acid, and (2) from about 5 to about 95 percent by weight of polymeric carboxy-ester-lactone.

3. The cover sheet of claim 1 wherein said addenda is a development inhibitor.

4. The cover sheet of claim 3 wherein said development inhibitor is benzotriazole, a benzimidazole, an indazole, a mercaptothiazole, a mercaptooxazole, a mercaptodiazole, a mercaptothiadiazole, a mercaptopyrimidine, a mercaptobenzoxazole, a mercaptobenzimidazole or a mercaptotetrazole.

* * * * *